(12) United States Patent
Metzger, II et al.

(10) Patent No.: US 7,962,404 B1
(45) Date of Patent: Jun. 14, 2011

(54) SYSTEMS AND METHODS FOR DETERMINING LOAN OPPORTUNITIES

(75) Inventors: Frank X. Metzger, II, Noblesville, IN (US); Sherri Joyann Densmore, Pullman, WA (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 550 days.

(21) Appl. No.: 11/936,720

(22) Filed: Nov. 7, 2007

(51) Int. Cl.
G06Q 40/00 (2006.01)

(52) U.S. Cl. .................. 705/38; 705/7; 705/10; 705/14; 705/35; 705/40; 707/2; 707/3; 709/206; 706/62; 725/34; 382/139

(58) Field of Classification Search .................. 382/139; 705/1, 2, 4, 7, 10, 14, 14.26, 16, 35, 38, 39, 705/40; 706/62; 707/3, 2; 709/206; 725/9, 725/34

See application file for complete search history.

(56) References Cited

U.S. PATENT DOCUMENTS

| | | | |
|---|---|---|---|
| 4,775,935 A | | 10/1988 | Yourick |
| 4,812,628 A | | 3/1989 | Boston et al. |
| 4,947,028 A | | 8/1990 | Gorog |
| 4,982,346 A | | 1/1991 | Girouard et al. |
| 5,201,010 A | * | 4/1993 | Deaton et al. .................. 382/139 |
| 5,283,731 A | | 2/1994 | Lalonde et al. |
| 5,305,195 A | | 4/1994 | Murphy |
| 5,459,306 A | | 10/1995 | Stein et al. |
| 5,504,675 A | | 4/1996 | Cragun et al. |
| 5,515,098 A | | 5/1996 | Carles |
| 5,592,560 A | | 1/1997 | Deaton et al. |
| 5,627,973 A | | 5/1997 | Armstrong et al. |
| 5,649,114 A | | 7/1997 | Deaton et al. |
| 5,661,516 A | | 8/1997 | Carles |
| 5,724,521 A | | 3/1998 | Dedrick |
| 5,740,549 A | | 4/1998 | Reilly et al. |
| 5,774,868 A | | 6/1998 | Cragun et al. |
| 5,848,396 A | | 12/1998 | Gerace |
| 5,857,175 A | | 1/1999 | Day et al. |

(Continued)

FOREIGN PATENT DOCUMENTS

CN 1290373 5/2001

(Continued)

OTHER PUBLICATIONS

Andrew Reinbach, MCIF aids banks in CRA compliance, Bank Systems & Technology, vol. 32, No. 8, pp. 27, Aug. 1995.*
"Atlas On Demand, Concurrent, and Everstream Strike Video-On-Demand Advertising Alliance", ATLASSOLUTIONS.COM, Jul. 13, 2006, 3 pages.
"Epsilon Leads Discussion on Paradigm Shift in TV Advertising," EPSILON.COM, Jun. 24, 2004, 2 pages, http://www.epsilon.com/who-pr_tvad040624.html.

(Continued)

*Primary Examiner* — Ella Colbert
*Assistant Examiner* — B. Joan Amelunxen
(74) *Attorney, Agent, or Firm* — Knobbe, Martens, Olson & Bear LLP

(57) ABSTRACT

A loan opportunity system is configured to analyze loan data and/or population data in order to determine loan opportunities for a lender, such as a credit union. In one embodiment a lender is initially provided with one or more estimated loan opportunity indicators, such as indicators of quantities of loans in a specific geographic region for which the lender can likely offer lower rates. Subsequently, upon completion of a payment agreement with a loan opportunity provider, for example, and establishment of loan parameters associated with borrowers (and their existing loans) to which the lender would like to make firm offers of credit, the lender is provided with a loan opportunity list indicating details of borrowers and their respective loans for which the particular lender can likely offer lower rates.

17 Claims, 9 Drawing Sheets

U.S. PATENT DOCUMENTS

| | | | |
|---|---|---|---|
| 5,873,068 A | 2/1999 | Beaumont et al. | |
| 5,930,776 A | 7/1999 | Dykstra et al. | |
| 5,940,812 A | 8/1999 | Tengel et al. | |
| 5,944,790 A | 8/1999 | Levy | |
| 5,974,396 A | 10/1999 | Anderson et al. | |
| 5,991,735 A | 11/1999 | Gerace | |
| 6,029,139 A | 2/2000 | Cunningham et al. | |
| 6,044,357 A | 3/2000 | Garg | |
| 6,070,147 A | 5/2000 | Harms et al. | |
| 6,101,486 A | 8/2000 | Roberts et al. | |
| 6,144,948 A | 11/2000 | Walker et al. | |
| 6,185,543 B1 | 2/2001 | Galperin et al. | |
| 6,208,979 B1* | 3/2001 | Sinclair | 705/38 |
| 6,236,977 B1* | 5/2001 | Verba et al. | 705/10 |
| 6,289,318 B1 | 9/2001 | Barber | |
| 6,298,330 B1 | 10/2001 | Gardenswartz et al. | |
| 6,317,752 B1 | 11/2001 | Lee et al. | |
| 6,324,566 B1 | 11/2001 | Himmel et al. | |
| 6,334,110 B1 | 12/2001 | Walter et al. | |
| 6,385,592 B1 | 5/2002 | Angles et al. | |
| 6,412,012 B1 | 6/2002 | Bieganski et al. | |
| 6,442,577 B1 | 8/2002 | Britton et al. | |
| 6,460,036 B1 | 10/2002 | Herz | |
| 6,611,816 B2 | 8/2003 | Lebda et al. | |
| 6,615,247 B1 | 9/2003 | Murphy | |
| 6,623,529 B1 | 9/2003 | Lakritz | |
| 6,640,215 B1 | 10/2003 | Galperin et al. | |
| 6,665,715 B1 | 12/2003 | Houri | |
| 6,757,740 B1 | 6/2004 | Parekh et al. | |
| 6,810,356 B1 | 10/2004 | Garcia-Franco et al. | |
| 6,925,441 B1 | 8/2005 | Jones, III et al. | |
| 6,959,281 B1* | 10/2005 | Freeling et al. | 705/10 |
| 6,983,478 B1 | 1/2006 | Grauch et al. | |
| 6,993,493 B1 | 1/2006 | Galperin et al. | |
| 7,003,792 B1 | 2/2006 | Yuen | |
| 7,033,792 B2 | 4/2006 | Zhong et al. | |
| 7,072,853 B2 | 7/2006 | Shkedi | |
| 7,072,963 B2 | 7/2006 | Anderson et al. | |
| 7,150,030 B1 | 12/2006 | Eldering et al. | |
| 7,152,018 B2 | 12/2006 | Wicks | |
| 7,152,237 B2 | 12/2006 | Flickinger et al. | |
| 7,185,353 B2 | 2/2007 | Schlack | |
| 7,275,083 B1* | 9/2007 | Seibel et al. | 709/206 |
| 7,360,251 B2 | 4/2008 | Spalink et al. | |
| 7,366,694 B2* | 4/2008 | Lazerson | 705/38 |
| 7,472,088 B2* | 12/2008 | Taylor et al. | 705/38 |
| 7,499,868 B2 | 3/2009 | Galperin et al. | |
| 7,546,619 B2 | 6/2009 | Anderson et al. | |
| 7,571,139 B1* | 8/2009 | Giordano et al. | 705/40 |
| 7,580,856 B1* | 8/2009 | Pliha | 705/14.26 |
| 7,590,589 B2* | 9/2009 | Hoffberg | 705/37 |
| 7,610,257 B1* | 10/2009 | Abrahams | 706/62 |
| 7,653,592 B1* | 1/2010 | Flaxman et al. | 705/38 |
| 7,672,865 B2 | 3/2010 | Kumar et al. | |
| 7,698,236 B2 | 4/2010 | Cox et al. | |
| 7,730,509 B2 | 6/2010 | Boulet et al. | |
| 2001/0039523 A1 | 11/2001 | Iwamoto | |
| 2002/0023051 A1* | 2/2002 | Kunzle et al. | 705/38 |
| 2002/0046099 A1 | 4/2002 | Frengut et al. | |
| 2002/0049968 A1 | 4/2002 | Wilson et al. | |
| 2002/0123904 A1 | 9/2002 | Amengual et al. | |
| 2002/0128960 A1* | 9/2002 | Lambiotte et al. | 705/38 |
| 2002/0129368 A1 | 9/2002 | Schlack et al. | |
| 2002/0133404 A1 | 9/2002 | Pedersen | |
| 2002/0194103 A1 | 12/2002 | Nabe | |
| 2003/0033242 A1* | 2/2003 | Lynch et al. | 705/38 |
| 2003/0036996 A1* | 2/2003 | Lazerson | 705/38 |
| 2003/0046223 A1 | 3/2003 | Crawford et al. | |
| 2003/0216965 A1* | 11/2003 | Libman | 705/14 |
| 2003/0233323 A1* | 12/2003 | Bilski et al. | 705/40 |
| 2004/0078809 A1 | 4/2004 | Drazin | |
| 2004/0107125 A1* | 6/2004 | Guheen et al. | 705/7 |
| 2004/0122730 A1 | 6/2004 | Tucciarone et al. | |
| 2004/0122735 A1 | 6/2004 | Meshkin | |
| 2004/0139025 A1 | 7/2004 | Coleman | |
| 2004/0163101 A1* | 8/2004 | Swix et al. | 725/9 |
| 2004/0199584 A1 | 10/2004 | Kirshenbaum et al. | |
| 2004/0205157 A1 | 10/2004 | Bibelnieks et al. | |
| 2005/0021397 A1 | 1/2005 | Cui et al. | |
| 2005/0086579 A1 | 4/2005 | Leitner et al. | |
| 2005/0209922 A1 | 9/2005 | Hofmeister | |
| 2005/0222906 A1 | 10/2005 | Chen | |
| 2005/0251820 A1* | 11/2005 | Stefanik et al. | 725/34 |
| 2005/0278743 A1 | 12/2005 | Flickinger et al. | |
| 2005/0288954 A1 | 12/2005 | McCarthy et al. | |
| 2006/0004731 A1* | 1/2006 | Seibel et al. | 707/3 |
| 2006/0041443 A1* | 2/2006 | Horvath | 705/1 |
| 2006/0080233 A1 | 4/2006 | Mendelovich et al. | |
| 2006/0080251 A1 | 4/2006 | Fried et al. | |
| 2006/0155639 A1 | 7/2006 | Lynch et al. | |
| 2006/0206379 A1 | 9/2006 | Rosenberg | |
| 2006/0212353 A1 | 9/2006 | Roslov et al. | |
| 2006/0224696 A1 | 10/2006 | King et al. | |
| 2006/0229943 A1 | 10/2006 | Mathias et al. | |
| 2006/0242039 A1* | 10/2006 | Haggerty et al. | 705/35 |
| 2006/0242046 A1* | 10/2006 | Haggerty et al. | 705/35 |
| 2006/0242049 A1 | 10/2006 | Haggerty et al. | |
| 2006/0242050 A1* | 10/2006 | Haggerty et al. | 705/35 |
| 2006/0242051 A1 | 10/2006 | Haggerty et al. | |
| 2006/0282359 A1 | 12/2006 | Nobili et al. | |
| 2006/0287915 A1 | 12/2006 | Boulet et al. | |
| 2006/0287919 A1 | 12/2006 | Rubens et al. | |
| 2006/0293921 A1 | 12/2006 | McCarthy et al. | |
| 2006/0293954 A1 | 12/2006 | Anderson et al. | |
| 2006/0293955 A1 | 12/2006 | Wilson et al. | |
| 2006/0294199 A1 | 12/2006 | Bertholf | |
| 2007/0011020 A1 | 1/2007 | Martin | |
| 2007/0011039 A1 | 1/2007 | Oddo | |
| 2007/0022032 A1 | 1/2007 | Anderson et al. | |
| 2007/0061195 A1 | 3/2007 | Liu et al. | |
| 2007/0061243 A1 | 3/2007 | Ramer et al. | |
| 2007/0067297 A1 | 3/2007 | Kublickis | |
| 2007/0078835 A1 | 4/2007 | Donnelli | |
| 2007/0192165 A1* | 8/2007 | Haggerty et al. | 705/10 |
| 2007/0192409 A1 | 8/2007 | Kleinstern et al. | |
| 2007/0208619 A1 | 9/2007 | Branam et al. | |
| 2007/0226130 A1* | 9/2007 | Haggerty et al. | 705/38 |
| 2007/0233857 A1 | 10/2007 | Cheng et al. | |
| 2007/0244732 A1* | 10/2007 | Chatterji et al. | 705/7 |
| 2007/0288271 A1* | 12/2007 | Klinkhammer | 705/4 |
| 2007/0288950 A1 | 12/2007 | Downey et al. | |
| 2007/0288953 A1 | 12/2007 | Sheeman et al. | |
| 2008/0005313 A1 | 1/2008 | Flake et al. | |
| 2008/0010206 A1 | 1/2008 | Coleman | |
| 2008/0028067 A1 | 1/2008 | Berkhin et al. | |
| 2008/0059317 A1* | 3/2008 | Chandran et al. | 705/16 |
| 2008/0120155 A1* | 5/2008 | Pliha | 705/7 |
| 2008/0184289 A1 | 7/2008 | Cristofalo et al. | |
| 2008/0228635 A1* | 9/2008 | Megdal et al. | 705/38 |
| 2008/0255897 A1* | 10/2008 | Megdal et al. | 705/7 |
| 2008/0294540 A1* | 11/2008 | Celka et al. | 705/35 |
| 2008/0301727 A1 | 12/2008 | Cristofalo et al. | |
| 2009/0018996 A1* | 1/2009 | Hunt et al. | 707/2 |
| 2009/0044246 A1 | 2/2009 | Sheehan et al. | |
| 2009/0094640 A1 | 4/2009 | Anderson et al. | |
| 2009/0133058 A1 | 5/2009 | Kouritzin et al. | |
| 2009/0288109 A1 | 11/2009 | Downey et al. | |
| 2010/0037255 A1 | 2/2010 | Sheehan et al. | |
| 2010/0138290 A1 | 6/2010 | Zschocke et al. | |

FOREIGN PATENT DOCUMENTS

| | | | |
|---|---|---|---|
| EP | 0 749 081 A1 | | 12/1996 |
| EP | 1-122-664 | * | 8/2001 |
| WO | WO 97/23838 | | 7/1997 |
| WO | WO 99/04350 | * | 1/1999 |
| WO | WO 99/22328 | * | 5/1999 |
| WO | WO 99/33012 | | 7/1999 |
| WO | WO 00/55790 | | 9/2000 |
| WO | WO 01/11522 | | 2/2001 |
| WO | WO 01/25896 | | 4/2001 |
| WO | WO 01/75754 | * | 10/2001 |
| WO | WO 03/101123 | * | 12/2003 |
| WO | WO 2004/114160 | | 12/2004 |
| WO | WO 2007/149941 | * | 12/2007 |

OTHER PUBLICATIONS

"IRI and Acxiom Introduce More Efficient and Actionable Approach To Consumer Segmentation and Targeted Marketing," EU-MARKETINGPORTAL.DE, Jan. 26, 2006, 2 pages, http://www.eu-marketingportal.de/web/index.cfm/IRI_and_Acxiom_Introduce_More_Efficient_and.

"Accenture Completes Acquisition of Media Audits: Acquisition Expands Company's Marketing Sciences and Data Services Capabilities," ACCENTURE.COM, Dec. 12, 2005, 2 pages, http://accenture.tekgroup.com/article_display.cfm?article_id=4282.

"Accenture Launches Media Audit and Optimization Service to Help U.S. Companies Measure Return on Investment in Advertising," Business Wire, May 22, 2006, 2 pages, http://findarticles.com/p/articles/mi_m0EIN/is_2006_May_22/ai_n16374159.

"Arbitron 2006 Black Consumers," Arbitron Inc., LVTSG.COM, Jul. 8, 2006, 2 pages, http://www.lvtsg.com/news/publish/Factoids/article_3648.shtml.

"Atlas On Demand and C-COR Join Forces to Offer Advertising Management Solution for On Demand TV: Global Provider of On Demand Systems Partners with Atlas to Develop and Market Comprehensive VOD Advertising Solution," ATLASSOLUTIONS.COM, Jul. 25, 2005, 3 pages.

Atlas On Demand and Tandberg Television Join Forces to Enhance Dynamic Ad Placement for On-Demand Television: Combined End-to End Solution to Provide Media Buying and Selling Communities with New Tools for Dynamic Advertising that Eliminate Technical Bar (web print out date is Jun. 22, 2006—3 pages).

"Cable Solution Now, The Industry Standard For Information Management: Strata's TIM.net Crosses Important Threshold Dominant Solution for All Top 20 TV Markets," STRATAG.COM, Apr. 28, 2006, 1 page, http://stratag.com/news/cablepress042806.html.

"Claritas Forms Life Insurance Consortium with Worldwide Financial Services Association: Initiative with LIMRA International is First of its Kind to Provide Actual Sales Information at Small Geographic Areas," CLARITAS.COM, Feb. 9, 2006, 3 pages, http.

"Claritas Introduces PRIZM NE Consumer Electronic Monitor Profiles: New Information Product Provides Insight Into The Public's Purchasing Behaviors of Consumer Electronics," CLARITAS.COM May 30, 2006, 3 pages.

Information Resources, Inc. and Navic Networks From Joint Relationship to Support Next Generation of Technology for Advertising Testing, "IRI Expands BehaviorScan® Solution to Meet Digital and On-demand Needs," INFORES.COM, Feb. 27, 2006, 2 pages, http:/.

"Mediamark Research Inc. Releases Findings From Mobile Marketing Consumer Study; Outback Steakhouse and Royal Caribbean Cruise Lines Among Brands Participating in Mobile Marketing Research," THEFREELIBRARY.COM, May 9, 2006, 4 pages, http://thefreelibrary.

"SRC Announces Free Dashups to Mashups Adding Geographic Business Intelligence at Web Speed to the Enterprise on www.FreeDemographics.com/API," DIRECTIONSMAG.COM, Jun. 12, 2006, 3 pages, http://www.directionsmag.com/press.releases/index.php?duty=Show&id=1.

"SRC Delivers Industry's First Drive Time Engine Developed to Follow Actual Road Networks," THOMASNET.COM, May 21, 2006, 4 pages, http://news.thomasnet.com/companystory/485722.

"VOD Integration Now Available in Strata: Buyers / Sellers Benefit from VOD Component on Popular Platform," STRATAG.COM, Feb. 21, 2006, 1 page, http://www.stratag.com/news/mediapress022106.html.

Adweek, "Aim High: Ad Targeting Moves to the Next Level," dated Jan. 21, 2008 as downloaded from http://www.adweek.com/aw/magazine/article_display.isp?vnu on Apr. 16, 2008.

Adzilla, Press Release, "ZILLACASTING technology approved and patent pending," dated May 16, 2005 as downloaded from http://www.adzilla.com/newsroom/pdf/patent_051605.pdf on May 28, 2008.

AFX New Limited—AFX International Focus, "Nielsen moving to measure off-TV viewing," Jun. 14, 2006, 1 page.

Bachman, katy, "Arbitron, VNU Launch Apollo Project," MEDIAWEEK.COM Jan. 17, 2006, 3 pages, http://www.mediaweek.com/mw/search/article_display.jsp?schema=&vnu_content_id=1001847353.

Click Z, "ISPs Collect User Data for Behavioral Ad Targeting," dated Jan. 3, 2008 as downloaded from http://www.clickz.com/showPage.html?page=clickz on Apr. 16, 2008.

CNET NEWS.COM, "Target me with your ads, please," dated Dec. 5, 2007 as downloaded from http://www.news.com/2102-1024_3-6221241.html?tag+st.util.print on Mar. 18, 2008.

Creamer, Matthew, "Consulting in marketing; Accenture, others playing role in firms' processes," Crain's Chicago Business, Jun. 12, 2006, 2 pages, Crain Communications.

Experian "Custom Strategist and Qualifil" from Funds, Jun. 2000.

Delany, Kevin J., et al. Firm Mines Offline Data To Target Online Ads; Commercial Alert; as downloaded from http://www.commercialalert.org/news/archive/2007/10/firm-mines-offline... on Apr. 22, 2008.

DEMOGRAPHICSNOW.COM, sample reports, "Age Rank Report", Jul. 17, 2006, 3 pages.

DEMOGRAPHICSNOW.COM, sample reports, "Consumer Expenditure Summary Report", Jul. 17, 2006, 3 pages.

DEMOGRAPHICSNOW.COM, sample reports, "Income Comparison Report", Jul. 17, 2006, 4 pages.

Dominique Haughton et al., "Direct Marketing Modeling with CART and CHAID", Journal of Direct Marketing, vol. 11, No. 4, Fall 1997.

eFunds Introduces Qualifile, 4 pages, Sep. 1999.

Front Porch Brochure, "Ad Networks—Partner with Front Porch!: Our Internet-Wide Behavioral Targeting Brings Ad Networks Higher Revenue", 2 pages.

Front Porch Brochure, "New Free Revenue for Broadband ISPs!: Get your share of the $20 billion online advertising market!", 2 pages.

Fusun Gonul et al., "Optimal Mailing of Catalogs: A New Methodology Using Estimable Structural Dynamic Programming Models", 14 pages, Management Science, vol. 44, No. 9, Sep. 1998.

Gabriel Bitran et al., "Mailing Decisions in Catalog Sales Industry", Management Science, vol. 42, No. 9, Sep. 1996, pp. 1364-1381.

Halliday, Jean, "Ford recruits Accenture for marketing plan," Automotive News Feb. 13, 2006, 2 pages, Crain Communications.

Helm, Burt, "Nielsen's New Ratings Yardstick," BUSINESSWEEK.COM, Jun. 20, 2006, 3 pages, http://www.businessweek.com/technology/content/jun2006/tc20060620_054223.htm.

Hinman, donald p., "The Perfect Storm: Response Metrics and Digital TV," CHIEFMARKETER.COM, May 17, 2006, 2 pages, http://www.chiefmarketercom/crm_loop/roi/perfect-storm-051706/index.html.

International Search Report and Written Opinion for PCT/US 08/83939, filed on Nov. 18, 2008, in 12 pages.

International Search Report and Written Opinion in PCT Application No. PCT/US2007/21815; Dated Sep. 5, 2008 in 11 pages.

Jan Roelf Bult et al., "Optimal Selection for Direct Mail", Marketing Science, vol. 14, No. 4, 1995, pp. 378-394.

Lars Muus et al., "A decision theoretic framework for profit maximization in direct marketing", 20 pages, Sep. 1996.

Main Page—Predictive Behavioral Targeting as downloaded from http://www.predictive-behavioral-targeting.com/index.php.Main_Page on Mar. 28, 2008.

NebuAD, Wall Street Journal Online, "Venture Capital: What's New", Oct. 22, 2007, 2 pages, http://www.nebaud.com/company/media_coverage/media_10_22_07.php Phorm, "The Open Internet Exchange", 2 pages, http://www.phorm.com/oix.

Phorm, Press Release Regarding Exclusive Agreements, 2 pages, http://www.phorm.com/about/launch_agreement.php.

Pieter Otter et al., "Direct mail selection by joint modeling of the probability and quantity of response", 14 pages, Jun. 1997.

Rap Interactive, Inc. and Web Decisions, "LiveDecisions", 2 pages.

UPI, "Nielsen Media Research goes electronic," Jun. 14, 2006, 1 page.

Webpage printed from <http://www.magnum.net/pdfs/RapUpBrochure.pdf.> On Mar. 4, 2008.

Whitney, Daisy, "Atlas Positioning to Shoulder VOD Ads; Campaign Management Tools Optimize Inventory," GOLIATH.COM, May 23, 2005, 2 pages, http://goliath.ecnext.com/coms2/gi_0199-4340604/Atlas-Positioning-to-shoulder-VOD.html.

* cited by examiner

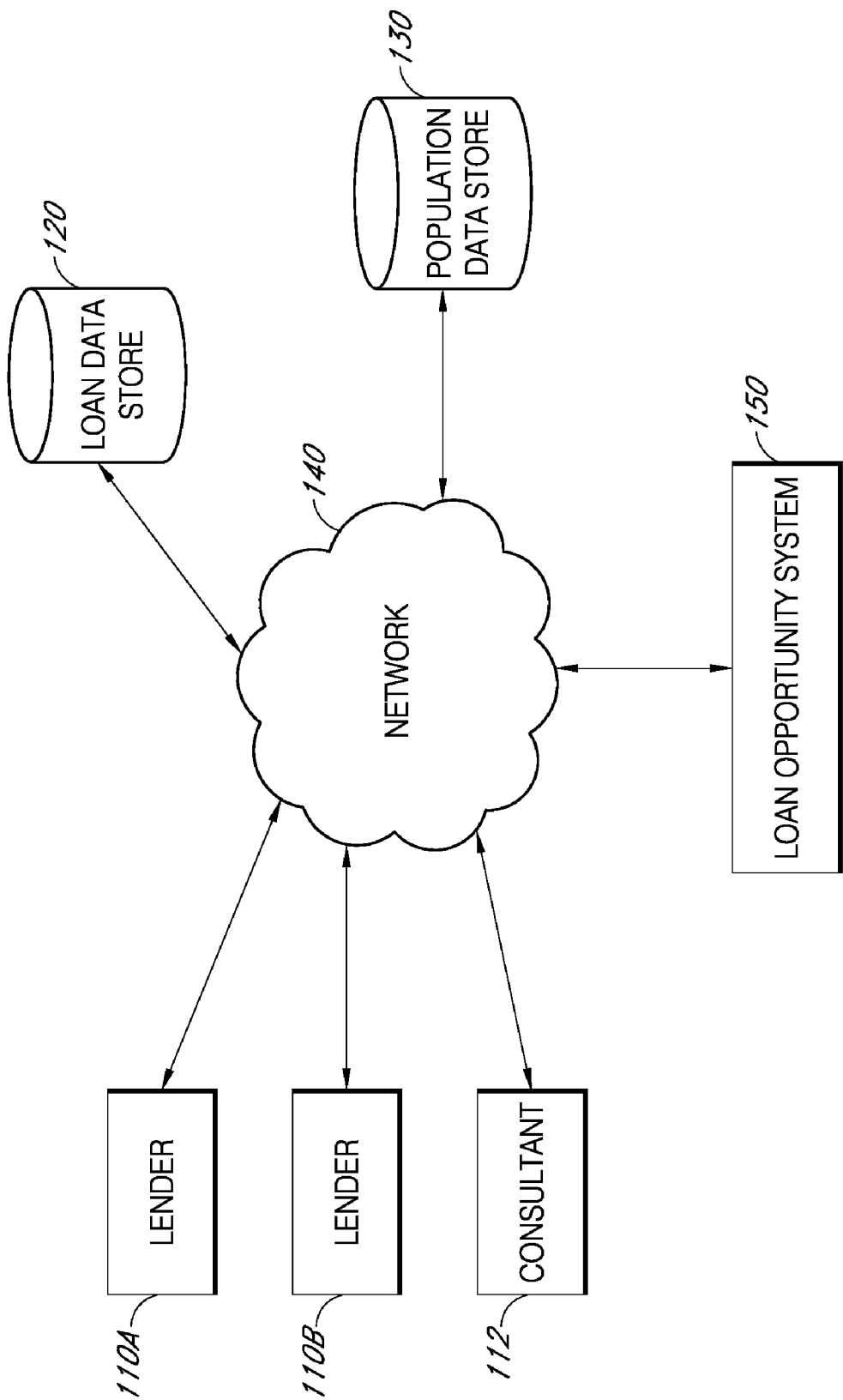

| Name | Address | City | State | ZIP Code | Credit score | Rounded $ loan balance | Rounded monthly payment amount | Estimated interest rate | Months in original term | Months remaining in term |
|---|---|---|---|---|---|---|---|---|---|---|
| Name | Address | City | State | ZIP Code | 734 | $17,800 | $450 | 7.9 | 60 | 46 |
| Name | Address | City | State | ZIP Code | 721 | $13,600 | $450 | 7.45 | 60 | 34 |
| Name | Address | City | State | ZIP Code | 744 | $15,600 | $450 | 8.2 | 60 | 33 |
| Name | Address | City | State | ZIP Code | 713 | $14,700 | $450 | 7.85 | 60 | 56 |
| Name | Address | City | State | ZIP Code | 729 | $15,600 | $500 | 8.33 | 60 | 21 |
| Name | Address | City | State | ZIP Code | 733 | $16,800 | $500 | 8.75 | 60 | 13 |
| Name | Address | City | State | ZIP Code | 709 | $14,300 | $450 | 7.99 | 60 | 24 |
| Name | Address | City | State | ZIP Code | 714 | $17,900 | $450 | 11.2 | 60 | 22 |
| Name | Address | City | State | ZIP Code | 722 | $16,600 | $450 | 10.6 | 60 | 44 |
| Name | Address | City | State | ZIP Code | 689 | $12,400 | $400 | 7.88 | 60 | 46 |
| Name | Address | City | State | ZIP Code | 685 | $20,000 | $550 | 9.75 | 60 | 35 |
| Name | Address | City | State | ZIP Code | 720 | $21,200 | $500 | 8.33 | 60 | 21 |
| Name | Address | City | State | ZIP Code | 699 | $9,800 | $400 | 8.85 | 48 | 13 |
| Name | Address | City | State | ZIP Code | 685 | $19,800 | $550 | 9.65 | 60 | 21 |
| Name | Address | City | State | ZIP Code | 715 | $14,500 | $450 | 8.35 | 60 | 15 |
| Name | Address | City | State | ZIP Code | 688 | $13,300 | $400 | 7.99 | 60 | 35 |

SYSTEMS AND METHODS FOR DETERMINING LOAN OPPORTUNITIES

BACKGROUND OF THE INVENTION

1. Field of the Invention

The invention relates to systems and methods for determining opportunities for providing lower rate loans to borrowers.

2. Description of the Related Art

Lenders typically desire to increase the quantity of loans that they finance. For this reason, some lenders seek to locate loans financed by other lenders and to offer refinance of the loans to their respective borrowers. Thus, lenders may send mass marketing letters, email, etc. advertising their loan rates to large quantities of individuals, hoping that some of the recipients of their marketing materials actually have existing loans to refinance and that the recipients current loan rate is higher than can be offered by the lender. However, this mass marketing approach is costly and results in limited responses. Additionally, the potential borrowers that respond to such mass marketing materials may not qualify for the advertised loan rates or may be entirely unqualified for a refinance loan from the lender.

SUMMARY OF THE INVENTION

In one embodiment, a method of determining automobile loan opportunities for a credit union comprises determining a geographic region serviced by the credit union, accessing population data estimating a quantity of adult individuals in the geographic region, accessing data estimating a percentage of adults in the geographic region that are currently making payments on at least one automobile loan, determining an estimated quantity of automobile loans in the geographic region based on the quantity of adult individuals in the geographic region and the estimated percentage, receiving a credit union loan quantity indicating an approximate quantity of automobile loans serviced by the credit union, and determining a loan opportunity quantity based on a difference between the credit union loan quantity and the estimated quantity of automobile loans.

In one embodiment, a computerized system for estimating a quantity of existing automobile loans having loan rates that are higher than an estimated credit union automobile loan rate comprises an analysis module configured to access data from a population data store and a loan data store and to determine an estimated quantity of automobile loans in a selected geographic region that are not financed by a credit union, one or more estimated credit union loan rates corresponding to a respective one or more credit tiers, and one or more non-credit union loan rates corresponding to respective of the one or more credit tiers and a report module configured to generate a user interface indicating, for each of the one or more credit tiers, an estimated quantity of existing automobile loans held by borrowers in the selected geographic region for which the non-credit union loan rate is higher than the corresponding credit union loan rate.

In one embodiment, a computer readable storage medium stores software code configured for execution on a computer system, wherein the software code is configured to perform the method comprising generating a user interface for receiving an indication of a geographic region from a user of the computer system, accessing population data estimating a quantity of adult individuals in the geographic region, accessing data estimating a percentage of adults in the geographic region having existing automobile loans, determining an estimated quantity of automobile loans in the geographic region based on the quantity of adult individuals in the geographic region and the estimated percentage, accessing a credit union loan quantity indicating an approximate quantity of automobile loans serviced by one or more credit unions, and determining a loan opportunity quantity based on a difference between the credit union loan quantity and the estimated quantity of automobile loans.

In one embodiment, a method of providing a detailed loan opportunity report to a lender comprises presenting to the lender information summarizing loan opportunities for the lender based on each of one or more combinations of borrower characteristics, entering an agreement with a lender to provide the detailed loan opportunity report, receiving one or more borrower filtering criteria from the lender, accessing borrower data regarding specific borrowers in a geographic region, the data comprising at least contact information associated with respective borrowers and loan information indicating characteristics of loans associated with respective borrowers, and generating a detailed loan opportunity report comprising at least some of the contact information and at least some of the loan information associated with borrowers having borrower data matching the borrower filtering criteria.

BRIEF DESCRIPTION OF THE DRAWINGS

FIG. 1A is a block diagram illustrating one embodiment of a loan opportunity system that is operated and/or controlled by a loan opportunity provider.

FIG. 4 illustrates an exemplary opportunity detail report including details of specific borrowers for which the customer can likely offer lower interest rates.

DETAILED DESCRIPTION OF THE PREFERRED EMBODIMENT

Figure 1B:
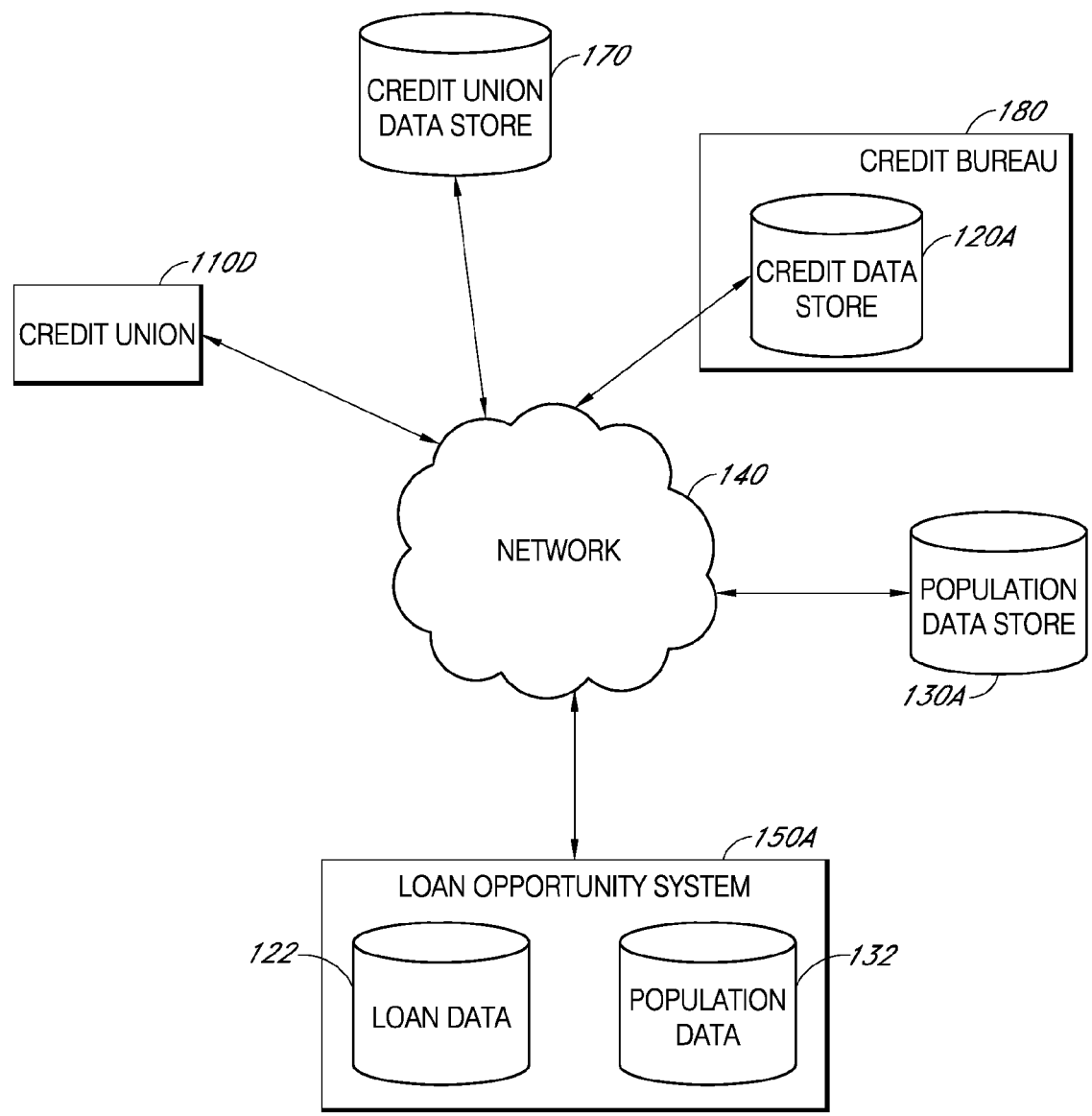
FIG. 1B is one embodiment of a loan opportunity system that is configured to provide loan opportunity data to a credit union.

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

FIG. 1A is a block diagram illustrating one embodiment of a loan opportunity system 150 that is operated and/or controlled by a loan opportunity provider. The loan opportunity provider generally controls operations of the loan opportunity system 150, such as to provide loan opportunities to customers of the loan provider. Depending on the embodiment, the loan opportunity provider may comprise a credit bureau, a consulting firm, or another private or government entity that has access to the data necessary to provide loan opportunities, as discussed further below.

In the embodiment of FIG. 1A, the loan opportunity system 150 is in communication with multiple customers of the loan opportunity provider, including lenders 110A, 110B, and a consultant 112, such as a lending consultant. Depending on the embodiment, the lenders 110A, 110B may comprise one or more of a bank, a credit union, a private lender, or any other type of lending entity. The loan opportunity system 150 is also in communication with a loan data store 120 and a population data store 130, which each may comprises one or more data stores.

In one embodiment, the loan opportunity system 150 comprises a computing device that accesses data from the loan data store 120 and/or the population data store 130 and uses the data to calculate loan opportunities for respective customers 110, wherein the loan opportunities indicate existing loans not currently financed by the requesting customer, or client of the customer (e.g., a client of the consultant 112), for which the requesting customer, or client of the customer, can likely offer lower rates. In one embodiment, the loan opportunity system 150 may further analyze data in the loan data store 120, for example, in order to identify specific borrowers for which a specific lender's loan rates appear to be lower than current rates associated with loans held by the specific borrowers. Accordingly, a customer may be provided with a list of borrowers, including contact information for the borrowers, that may be used in marketing efforts of the customer, such as providing loan offers to the identified borrowers, for example.

FIG. 1B is one embodiment of a loan opportunity system 150A that is configured to provide loan opportunity data to a credit union 110D. In the embodiment of FIG. 1B, the loan opportunity system 150A is in communication with a credit union data source 170, which stores data regarding loans offered by credit unions in one or more geographic regions. In one embodiment, for example, the credit union data source 170 comprises aggregate data from a plurality of credit unions throughout the United States that is provided by the National Credit Union Administration ("NCUA"). In one embodiment, the NCUA data is made available to the loan opportunity system 150A via request for records from the US government, such as under the Freedom of Information Act, for example. Thus, the credit union data source 170 may comprise data maintained by a government entity. In other embodiments, the credit union data source 170 comprises data maintained by similar entities in other countries, whether accessible directly by the loan opportunity system 150A or via a government records entity. In other embodiments, the credit union data source 170 comprises data maintained by a private entity. In one embodiment, the aggregate data maintained at the credit union data store 170 comprises average credit union loan rates, possibly for lenders in each of multiple credit tiers, for various geographic regions, such as ZIP or metropolitan statistical area ("MSA") regions, cities, counties, states, or larger regions, for example.

In the embodiment of FIG. 1B, the loan opportunity system 150A is also in communication with a credit bureau 180, which maintains a loan data store 120A. Thus, the loan data store 120A may comprise information obtained by the credit bureau's monitoring of credit-related activities of individuals. For example, the loan data store 120A may comprise information reported to the credit bureau 180 by a plurality of lenders, such as information regarding loans that are taken by individuals, as well as the details of the loans, including loan term, interest rate, and historical payment information, for example. In other embodiments, the loan data store 120A may be maintained by other private or government entities. Depending on the embodiment, the credit data store 120A and/or the loan data store 122 may comprise subsets of credit-related information that is stored by a credit bureau, such as a 5, 10, 20, 25, or 50 percent sampling of all credit bureau data.

The population data store 130 comprises data indicating respective populations for various geographic regions, percentages of regional populations that are adults, and/or gender percentages for specific geographic regions. In FIGS. 1A, 1B, the population data 130 is illustrated as a single data store; however, the population data store 130 may comprise multiple separate data stores, each storing various portions of the above-noted population data.

The exemplary loan opportunity system 150A comprises a loan data store 122 and a population data store 132, which store at least subsets of the information from credit union data store 170, credit data store 120A, and/or population data store 130A. In one embodiment, the loan data store 122 and/or population data store 132 are periodically updated with information from the networked data sources to include data sufficient to locate loan opportunities for the credit union 110D, as well as other lenders 110, without requesting additional data from the data sources 170, 120A, 130. For example, the data stores 122, 132 may comprise data tables, such as spreadsheet or database data files, comprising the data necessary for providing loan opportunities to the credit union 110D.

Loan Opportunity System

Figure 2:
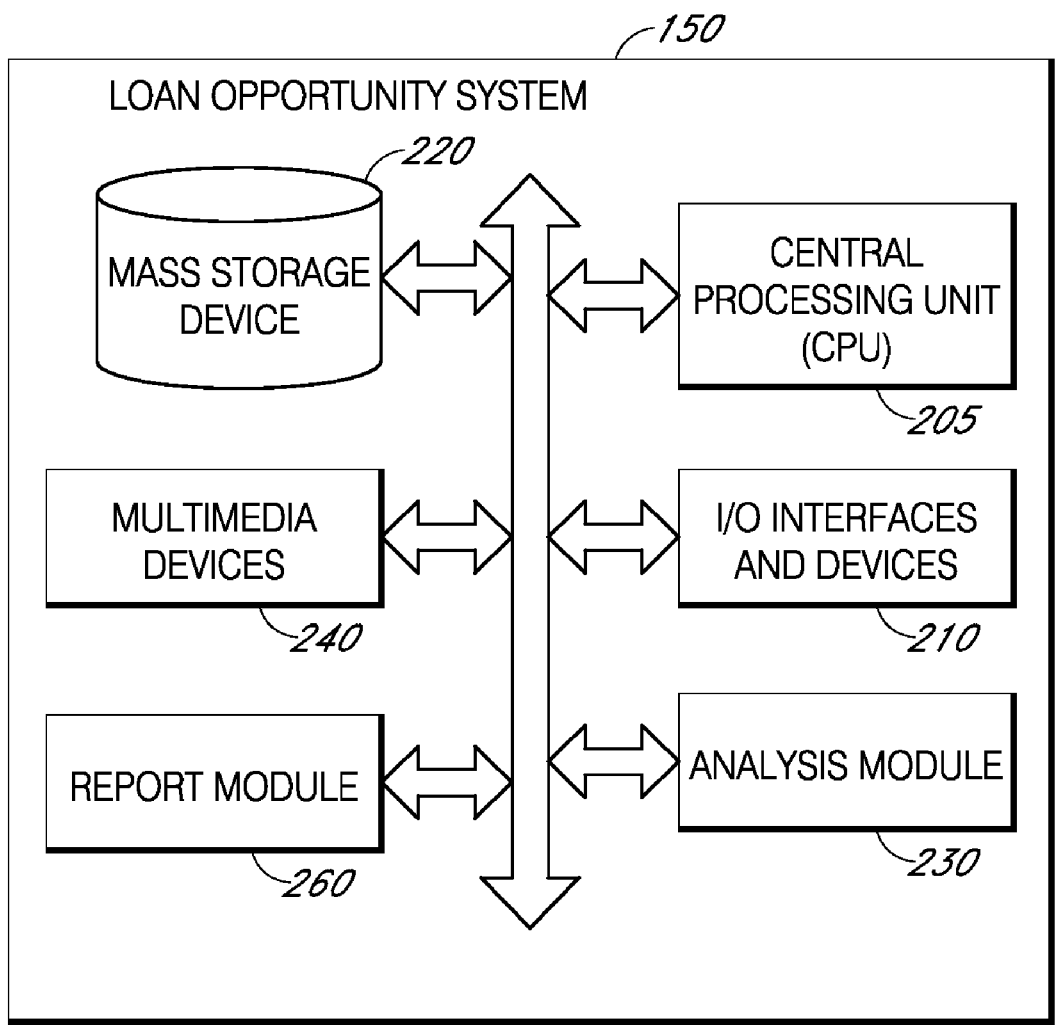
FIG. 2 is a block diagram illustrating one embodiment of the loan opportunity system of FIG. 1 and/or FIG. 2.

FIG. 2 is a block diagram illustrating one embodiment of the loan opportunity system 150, also referred to herein as simply the "system 150." In one embodiment, the loan opportunity system 150 is configured to interface with multiple devices and/or data sources, such as in the exemplary network configurations of FIGS. 1A and 1B. The loan opportunity system 150 may be used to implement certain systems and methods described herein. For example, in one embodiment the loan opportunity system 150 may be configured to analyze loan data and/or population data in order to determine loan opportunities for a lender. As used herein, the term "loan opportunities" includes indicators of estimated loans for which a lender can likely offer lower rates, as well as specific information regarding borrowers and loans for which a lender can likely offer lower rates. As described in further detail below, in one embodiment a lender is initially provided with one or more estimated loan opportunity indicators and then, upon completion of a payment agreement with the loan opportunity provider, for example, the lender is provided with a loan opportunity list indicating details of loans for which the particular lender can likely offer lower rates. The functionality provided for in the components and modules of the loan opportunity system 150 may be combined into fewer components and modules or further separated into additional components and modules.

In general, the word module, as used herein, refers to logic embodied in hardware or firmware, or to a collection of software instructions, possibly having entry and exit points, written in a programming language, such as, for example, C, C++, or C#. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In one embodiment, the loan opportunity system 150 includes, for example, a server or a personal computer that is IBM, Macintosh, or Linux/Unix compatible. In another embodiment, the loan opportunity system 150 comprises a laptop computer, smart phone, personal digital assistant, or other computing device, for example. In one embodiment, the exemplary loan opportunity system 150 includes a central processing unit ("CPU") 105, which may include a conventional microprocessor. The loan opportunity system 150 further includes a memory, such as random access memory ("RAM") for temporary storage of information and a read only memory ("ROM") for permanent storage of information, and a mass storage device 220, such as a hard drive, diskette, or optical media storage device. In certain embodiments, the mass storage device 220 comprises one or more of the loan data stores 122 and/or population data stores 132 discussed above with reference to FIG. 1B. Typically, the modules of the loan opportunity system 150 are in communication with one another via a standards based bus system. In different embodiments, the standards based bus system could be Peripheral Component Interconnect (PCI), Microchannel, SCSI, Industrial Standard Architecture (ISA) and Extended ISA (EISA) architectures, for example.

The loan opportunity system 150 is generally controlled and coordinated by operating system software, such as the Windows 95, 98, NT, 2000, XP, Vista, Linux, SunOS, Solaris, PalmOS, Blackberry OS, or other compatible operating systems. In Macintosh systems, the operating system may be any available operating system, such as MAC OS X. In other embodiments, the loan opportunity system 150 may be controlled by a proprietary operating system. Conventional operating systems control and schedule computer processes for execution, perform memory management, provide file system, networking, and I/O services, and provide a user interface, such as a graphical user interface ("GUI"), among other things.

The exemplary loan opportunity system 150 includes one or more commonly available input/output (I/O) interfaces and devices 210, such as a keyboard, mouse, touchpad, and printer. In one embodiment, the I/O devices and interfaces 210 include one or more display device, such as a monitor, that allows the visual presentation of data to a user. More particularly, a display device provides for the presentation of GUIs, application software data, and multimedia presentations, for example. The loan opportunity system 150 may also include one or more multimedia devices 140, such as speakers, video cards, graphics accelerators, and microphones, for example. In one embodiment, the I/O interfaces and devices 210 comprise devices that are in communication with modules of the loan opportunity system 150 via a network, such as the network 160 and/or any secured local area network, for example.

In the embodiment of FIG. 2, the I/O devices and interfaces 210 provide a communication interface to various external devices. In the embodiment of FIG. 1, the loan opportunity system 150 is in communication with a network 160, such as any combination of one or more LANs, WANs, or the Internet, for example, via a wired, wireless, or combination of wired and wireless, via a network interface of the I/O devices and interfaces 210.

In the embodiment of FIG. 2, the loan opportunity system 150 also includes two application modules that may be executed by the CPU 105. More particularly, the application modules include an analysis module 230 and a report module 260, which are each discussed in further detail below. Each of these application modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Analysis Module

The analysis module 230, in combination with other components of the loan opportunity system 150, is configured to access data that is used in determining loan opportunities for lenders, and to provide the resultant loan opportunity information to the report module 260 for reporting to the lender. For example, the analysis module 230 may access data stored in a mass storage device 220, the loan data store 120, and/or the population data store 130.

Report Module

The report module 260, in combination with other components of the loan opportunity system 150, is configured to receive loan opportunity data from the analysis module 230 and to generate one or more reports for delivery to the requesting customer, such as a lender 110 or consultant 112. Depending on the embodiment, the report module 260 delivers data to the customer in various formats, such as via a web-viewable document, a presentation document, or a spreadsheet document, for example. Depending on the embodiment, the reports generated by the loan opportunity system 150 may be viewed on a display device directly coupled to the loan opportunity system 150, such as on a screen of a laptop computer, a display device of a customer computing device, such as a monitor coupled to a computer located at the credit union 110D facility, or in a printed medium, for example.

In one embodiment, the report module 260 is configured to generate two general types of loan opportunity reports. A first report, referred to as an opportunity summary report, or simply a summary report, indicates estimated quantities of loans for which a lender 110 may offer lower rates, possibly divided into multiple categories of borrowers, such as borrowers in one or more credit tiers.

In one embodiment, the summary report is based on data that is not particular to a lender 110, but rather to lenders of a particular type, such as credit unions, for example. In other embodiments, the summary report is based on data that is specific to a particular lender, such as loan rates that are currently offered to borrowers in one or multiple credit tiers, for example. A second report, referred to as an opportunity detail report, or simply a detail report, provides information regarding specific loans for which the particular lender can likely offer lower rates. In one embodiment, the detail report is based on specific loan information provided from the loan data store 120 (FIG. 1A) or credit data store 120A (FIG. 1B), for example, such as data from lenders regarding specifics of loans that are handled by respective lenders. Depending on the embodiment, various data points may be included on each of the above-noted reports, such that a plurality of variations to each report are possible. The loan opportunity reports may be displayed to users in various formats, such as via web-accessible documents or in printed format, for example.

Loan Opportunity User Interface, Including Opportunity Summary Report

Figure 3A:
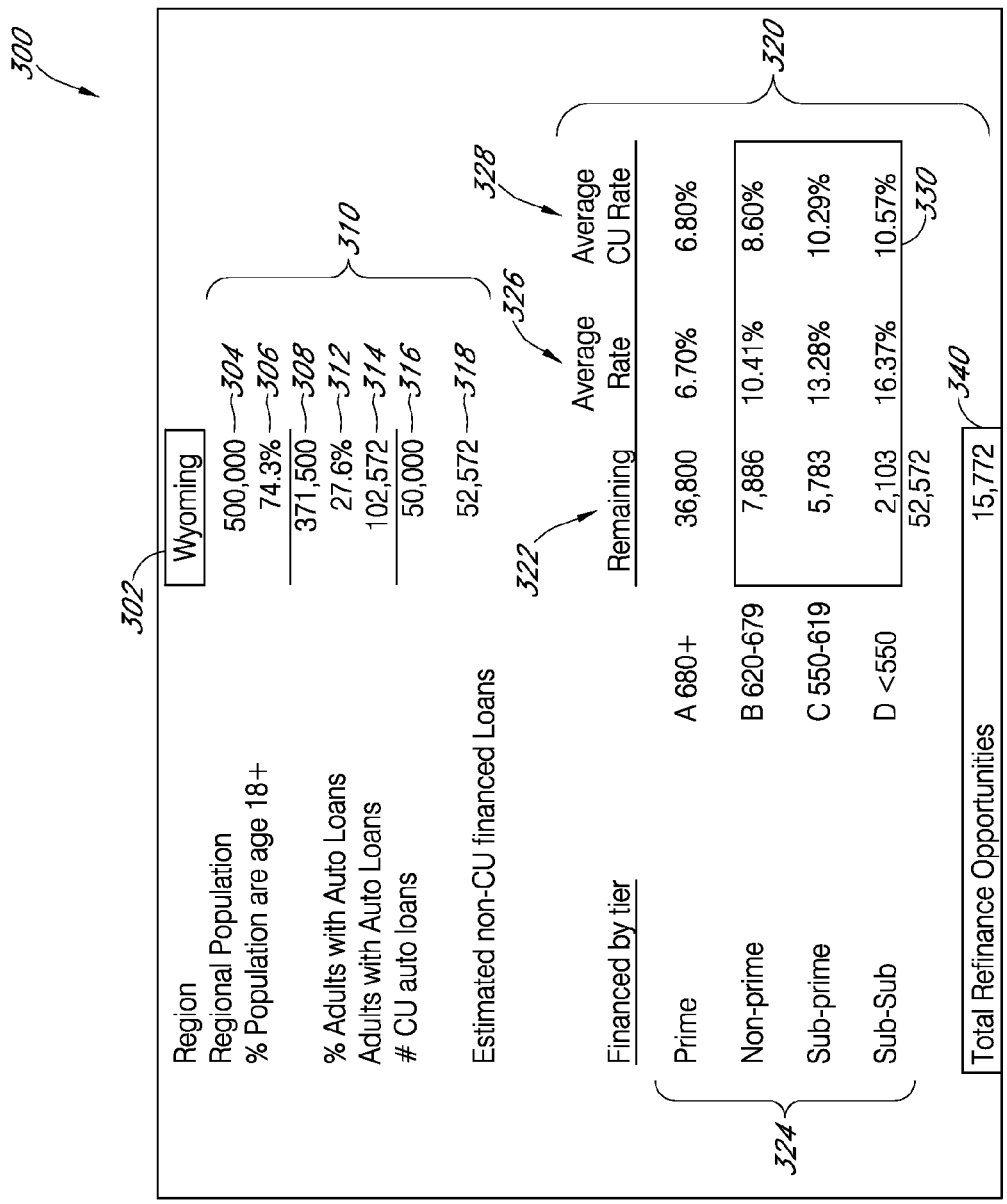
FIG. 3A illustrates one embodiment of a user interface for receiving data from a user and providing an opportunity summary report.

FIG. 3A illustrates one embodiment of a user interface 300 for receiving data from a user, such as a representative of the loan opportunity provider, and providing an opportunity summary report. The user interface 300 comprises a data portion 310 and a summary report 320. In this embodiment, the user interface 300 may be displayed to the user in one of multiple suitable software applications, such as via a web-browser, a spreadsheet application, or a standalone software application, for example. In one embodiment, the data in the summary report 320 is calculated and/or updated realtime as the data in the data portion 310 is provided by the user. In other embodiments, the user interface 300 comprises a link, such as a button, that initiates recalculation of the opportunity data in the summary report 320 when selected by the user. For the sake of clarity, certain of the systems and methods discussed herein refer specifically to identifying loan opportunities for credit unions. However, the systems and methods described herein may be implemented with respect to other types of lenders, such as banks, private lenders, finance lenders, or other types of lenders. For the sake of clarity, certain of the systems and methods discussed herein refer specifically to identifying automobile loan opportunities. However, the systems and methods described herein may be implemented with respect to other lines of credit, such as recreational vehicle loans (e.g., boats, motorcycles, jet skis, etc.), mortgages, home equity loans, credit cards, or other types of credit.

In the embodiment of FIG. 3, the data portion 310 comprises one or more data entry fields and/or one or more calculation fields, which are configured to provide numerical data accessed from one or more of the loan data store 120, population data store 130, or the data entry fields of the data portion 310. In the example of FIG. 3A, a region selection field 302 allows selection of a particular geographic region for assessing loan opportunities. In one embodiment, the selection field 302 comprises a text entry field wherein a user, such as a customer or the loan opportunity provider or a representative of the loan opportunity provider, may enter a geographic region. Depending on the embodiment, geographic regions may comprise one or more ZIP regions, MSA regions, municipalities, cities, counties, states, regions of multiple states, countries, multiple countries, or other regions, for example. In the embodiment of FIG. 3A, when a region is selected in region selection field 302, the population field 304, the percent of total population field 306, and the estimated adult population field 308 are automatically populated, such as based on data from the population data store 130. For example, in one embodiment the population data store 130 comprises census data that includes population data for multiple geographic regions, as well as data regarding an estimated percentage of adults in specific geographic regions. Accordingly, when a geographic region is selected via the selection field 302, the regional population and percentage adult population in the selected region may be accessed from the population data store 130 and used to populate fields 304 and 306, respectively. The regional adult population field 308 may then be populated by calculating the product of the numerical figures in fields 304 and 306. In the example of FIG. 3A, the selected region is the state of Wyoming. The analysis module 230, for example, has accessed the population data store 130 in order to determine that Wyoming has a regional population of 500,000, of which an estimated 74.3% are adults. Accordingly, the regional adult population is calculated as the product of 500,000×74.3%=371,500. In other embodiments, the regional population may be entered into the user interface 300 by the user.

In one embodiment, the analysis module 230 also accesses one or more of the population data store 130 and loan data store 120 to determine an estimated percentage of adults in the selected region having open automobile loans. For example, the loan data store 120 may comprise data from one or more credit bureau indicating an estimated percentage of adults in the region with open automobile loans. Depending on the embodiment, the percentage of adults with auto loans may be based on data from smaller or larger geographic regions than the selected region. For example, if the selected region comprises a MSA region, the percentage of adults with auto loans in the MSA region may be estimated to be substantially equal to the percentage of adults with auto loans in a state, wherein the MSA level data is not available from the loan data store 130, while the state level data is available from the loan data store 130. In FIG. 3A, the loan percentage field 312 is populated with the estimated percentage of adults in the selected region having outstanding automobile loans, as determined by accessing one or more of the data stores 120, 130, 120A, 130A, 170, 122, 132. The adults with loans field 314 may then be populated with the product of the regional adult population (e.g., field 308) and the estimated percentage of adults in the region with auto loans (e.g., field 312). Accordingly, in the example of FIG. 3A, the estimated number of adults in the region with auto loans is calculated as the product of 371,500×27.6%=102,572.

Exemplary user interface 300 also indicates a number of credit union auto loans field 316. Depending on the embodiment, field 316 may comprise a text entry field wherein the user may enter a number of open auto loans, or the field 316 may be auto-populated with data received from one or more data stores, such as the loan or population data stores 320, 330, such as data that originated from the NCUA, for example. The numerical figure in field 316 may represent the number of automobile loans held by the requesting customer in the selected geographic region or the estimated number of automobile loans held by all credit unions in the selected geographic region.

With the estimated number of outstanding credit union automobile loans in the user interface 300, the analysis module 230 may then calculate an estimated quantity of non-credit union financed automobile loans as the difference between the quantity of adults in the region with auto loans (e.g., field 314) and the number of credit union auto loans (e.g., field 316). In the example of FIG. 3A, the estimated non-credit union financed loans displayed in field 318 is calculated as the difference of 102,572−50,000=52,572. In this embodiment, the estimated non-credit union financed loans indicates an estimated quantity of loans in the region that are financed outside of credit unions. To certain customers of the loan opportunity provider, such as a credit union that offers lower rates than other types of lenders, this figure represents a total number of existing loans for which the credit union may offer lower rates.

Using the data provided by the user and/or calculated by the analysis module 230, which is displayed in data portion 310 of the user interface 300, the report module 260 generates one or more loan opportunity reports. In the embodiment of FIG. 3A, the summary report 320 indicates estimated loan opportunities for a credit union in the selected region for borrowers in each of multiple credit tiers. In the embodiment of FIG. 3A, a credit tier population column 322 indicates an estimated population in the region for each of the indicated credit tiers 324. In one embodiment, estimated percentages of the selected regional population within each of various subgroups, such as within respective credit tiers, is provided from one or more networked data stores. For example, in one embodiment the credit data store 120A (FIG. 1B) comprises information regarding an estimated percentage of the selected regional population that has credit in each of multiple respective credit tiers. Thus, in one embodiment the report module 260 calculates the numerical figures in column 322 by multiplying the estimated percentage of a regional population within a respective credit tier by the total estimated noncredit union financed loans (field 318).

In an average rate column 326 of the exemplary opportunity summary 320, the average rates for non-credit union loans within the selected geographic region are provided for each of the credit tiers 324. In one embodiment, the average rates in column 326 are accessed from the loan data store 120, such as from credit data store 120A (FIG. 1B). In an average credit union rate column 328 of the opportunity summary 320, the average credit union rates in the selected region are provided for each of the credit tiers 324. In one embodiment, the average credit union rates in column 328 are accessed from one or more of the data stores 120, 130, 120A, 130A, 170, 122, 132. In one particular embodiment, data regarding average credit union rates in a selected region is received from the credit union data store 170, which may comprises information compiled by the NCUA. In other embodiments, data regarding credit union rates may be obtained from any other suitable data source.

The exemplary opportunity summary 320 indicates those loans for which the average credit union rate (e.g., in column 328) is lower than the corresponding average non-credit union rates (e.g., in column 326). More particularly, the rectangle 330 highlights information regarding loans across multiple credit tiers for which credit unions in the selected region can likely offer lower rates than non-credit union loans. In other embodiments, summary loan opportunities may be indicated in other manners, such as in list format. The opportunity summary 320 further includes an estimated total loan opportunities in the selected region in field 340. In one embodiment, the total loan opportunities in the selected region is calculated as the total number of loans in each of one or more credit tiers for which the estimated credit union loan rate (e.g., in column 328) is less than the corresponding estimated loan rate in the region (e.g., in column 326). Thus, in example of FIG. 3A, the total refinance opportunities in field 340 is calculated as the sum of 7,886+5,783+2,103=15,772.

Figure 3B:
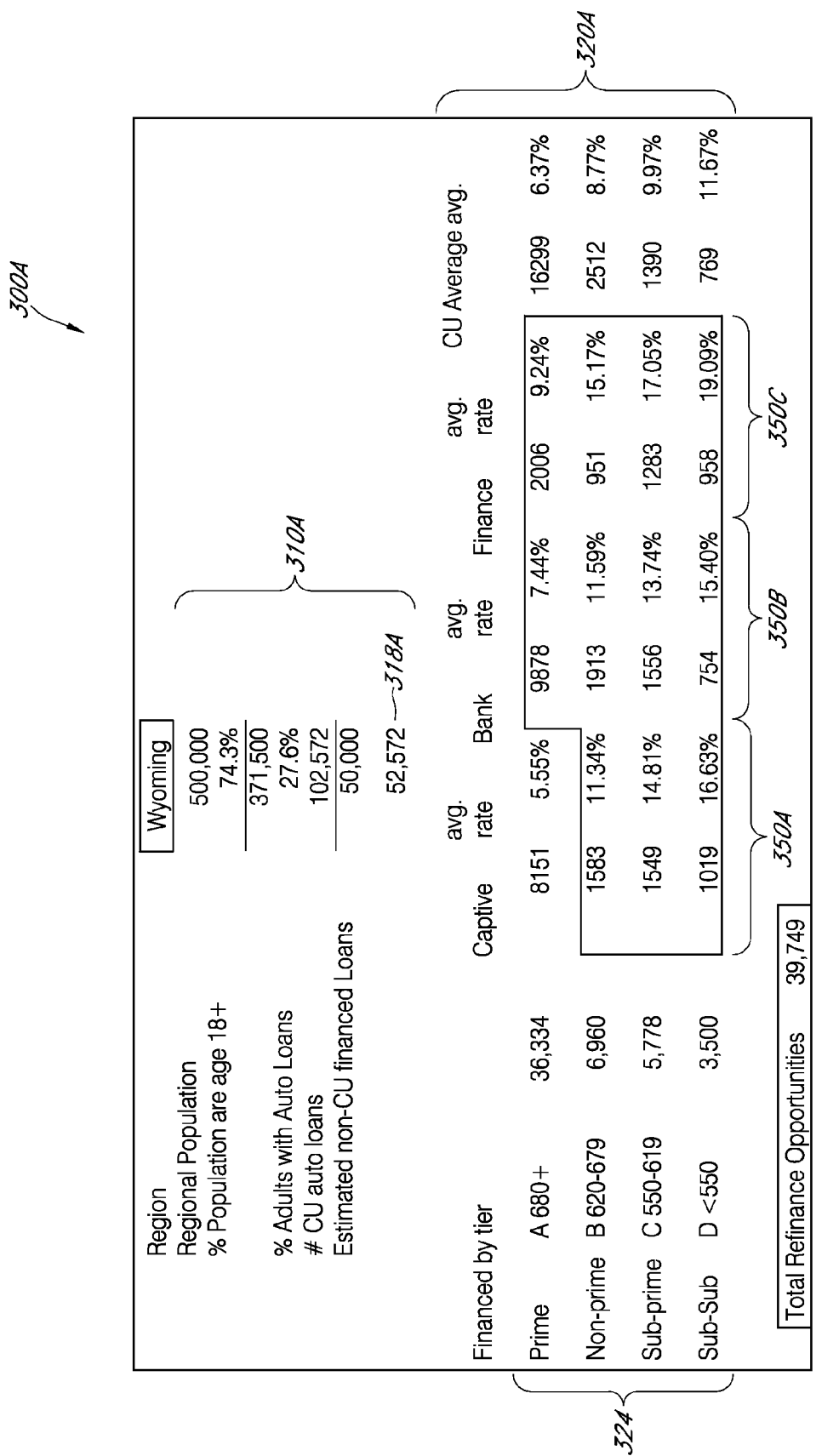
FIG. 3B illustrates another embodiment of a user interface for receiving data from a user and providing an opportunity summary report.

FIG. 3B illustrates another embodiment of a user interface 300A for receiving data from a user and providing an opportunity summary report. The user interface 300A comprises a data portion 310A and a summary report 320A. in embodiment of FIG. 3B, the data portion 310A is substantially the same as the data portion 310A of user interface 300 (FIG. 3A). Thus, the estimated non-credit union financed loans in field 318A is calculated in the same manner as discussed above with reference FIG. 3A.

The opportunity summary 320A separates the estimated non-credit union financed loans (e.g., in field 318A) into multiple credit tiers 324 and also into multiple lender types. More particularly, in the example of FIG. 3B the loan opportunities are divided into a captive loan section 350A, a bank loan section 350B, and a finance loan section 350C. Each of the sections 350, including section 350A, 350B, 350C, and other sections in other embodiments, includes average loan rates for respective lender types. Accordingly, the opportunity summary 320A provides the user with information regarding loan opportunities available to borrowers with outstanding loans from each of multiple lender types. As described in further detail below, a customer may request a opportunity detail report comprising borrower information from a selected one or more of the credit tiers 324, as well as from a selected one or more of the lender types 350.

In one embodiment, the report module 260 accesses data from one or more of the loan and population data stores 120, 130, for example, regarding estimated percentages of loans in the selected region that are serviced by multiple lender types, such as captive, bank, and/or finance lenders. As illustrated in FIG. 3B, the highlighting 330A indicates estimated quantities of loans for which a credit union in the selected region could likely offer lower rates than the respective current lenders.

Loan Opportunity Detail Report

FIG. 4 illustrates an exemplary opportunity detail report 400 including details of specific borrowers for which the customer may offer lower interest rates. Advantageously, the opportunity detail report 400 includes information for contacting borrowers with non-credit union loans, such as with a pre-approved line of credit offer or an invitation to apply for a loan with the customer credit union. In the embodiment of FIG. 4, the opportunity detail report 400 includes contact information 410 for each of a plurality of borrowers matching customer-specific, or default, parameters. Exemplary contact information 410 comprises a name, address, city, state, and zip code for each of the identified borrowers. In other embodiments, additional or less information regarding each borrower may be provided in the opportunity detail report 400. For example, in other embodiments an e-mail address and/or telephone number for the borrowers may be included in the contact information 410. The exemplary opportunity detail report 400 also list credit scores 420 for the matching borrowers. In one embodiment, a customer requesting the opportunity detail report may specify minimum and/or maximum credit scores for borrowers to be included on the report 400. For example, the customer may request that only borrowers with a credit score of more than 650 are included on the detail report 400.

The detail report 400 further comprises information regarding at least one automobile loan held by respective borrowers identified in the contact information 410. In particular, the loan information 430 may include a rounded loan balance, a rounded monthly payment amount, an estimated interest rate, a loan term, and/or a loan term remaining. In one embodiment, the customer may establish parameters for filtering borrowers based on specific attributes of their respective loans. For example, a customer may request that only loans having a balance of more than $5,000, or some other dollar amount, are included in the detail report 400. Similarly, customer parameters may indicate limits on monthly payment amounts, interest rates, loan term, and/or remaining loan term.

In one embodiment, the detail report 400 comprises data from one or more of the loan and population data stores 320, 330. For example, in one embodiment the loan data store 120, such as the credit data store 120A, comprises data from lenders indicating the particulars of loans financed by respective lenders. Thus, the loan opportunity system 150 may access the loan particulars for borrowers in a selected geographic region in order to identify borrowers for which lower rates are likely available from a requesting customer.

In one embodiment, the customer is provided with an opportunity summary report, such as those of FIG. 3A or 3B, that may be useful in setting customer-specific parameters for generating the detail report 400. In certain jurisdictions, the loan detail information in the loan data store 320 may only be accessed by the loan opportunity provider if a firm offer for a new credit line is going to be offered to every borrower on the loan detail report by the requesting customer. Accordingly, the customer is likely interested in having only those borrowers included on the detail report 400 for which the customer would actually want to extend firm loan offers. By providing the estimated loan opportunities in the summary report, the customer is provided with means for establishing parameters that are used in filtering borrowers for inclusion on the detail report 400. This may also potentially reduce costs for the requesting customer in situations where the detail report 400 is provided to the customer on a per-borrower cost basis.

As discussed above, the systems and methods described herein may be implemented with respect to other lines of credit, such as recreational vehicle loans (e.g., boats, motorcycles, jet skis, etc.), mortgages, home equity loans, credit cards, or other types of credit. In those embodiments where the loan opportunity system provides loan summary and/or detail information regarding other types of credit, the data sources accessed by the system may vary. Additionally, the information provided in the loan and/or detail reports may include different information than in the exemplary user interfaces described and illustrated herein.

Loan Opportunity Methods

Figure 5:
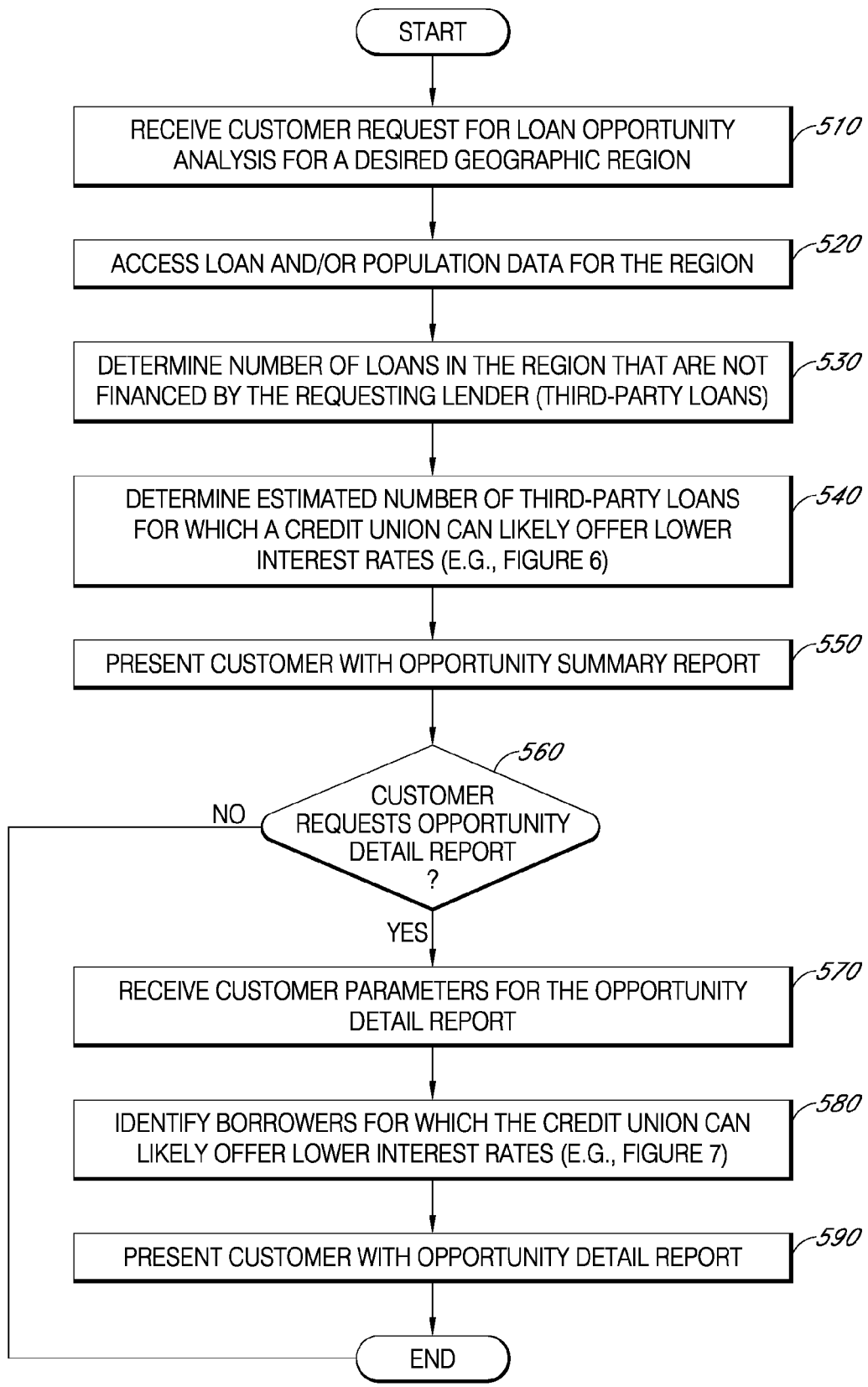
FIG. 5 is a flowchart illustrating an exemplary method of determining loan opportunities.

FIG. 5 is a flowchart illustrating an exemplary method of determining loan opportunities. In one embodiment, the method of FIG. 5 is performed by the loan opportunity system 150, including one or more of the analysis modules 230 and/or report module 260. Depending on the embodiment, the method of FIG. 5 may comprise fewer or additional blocks or the blocks may be arranged in different order.

Beginning in block 510, a customer request for loan opportunity analysis in a desired geographic region is received. In one embodiment, a representative of the loan opportunity provider receives a verbal request from a customer, such as a lender 110 or a consultant 112, and enters the geographic region into a user interface generated by the analysis module 230. For example, the representative may be presented with a user interface such as those in FIG. 3A or 3B, wherein information regarding a customer requested geographic region may be provided in the user interface. In another embodiment, the customer is provided with software that includes one or more of the analysis module 230 and the report module 260, such that the customer is able to view and interact with a user interface such as the interfaces of FIG. 3A or 3B, for example. With reference to FIG. 3A, for example, the geographic region of interest to the customer is selected in field 302.

Moving to block 520, loan and/or population data for the selected region is accessed. In one embodiment, the loan data 120 and/or the population data 130 are accessed by the loan opportunity system 150. In one embodiment, the loan and/or population data stores 120, 130 are accessed via a network link, such as via the network 140 of FIGS. 1A and 1B. in another embodiment, such as in FIG. 1B, the loan opportunity system 150a comprises a loan data store 122 and a population data store 132, which may be a subset of the data on respective credit data store 120A, population data store 130A, and/or credit union data store 170.

Next, in block 530 a quantity of loans in the selected region that are not financed by the requesting lender, referred to herein as third-party loans, is determined. As described with reference to FIG. 3A, the estimation of third-party loans in a region may comprise a series of data lookups and/or calculations on the data. In particular, the regional population, the percentage of adults in the region, the percentage of adults with auto loans in the region, and the number of credit union loans in the region may all be received from the customer or accessed in one or more of the data stores 120, 130, 120A, 130A, 122, 132, 170.

Continuing to block 540, an estimated number of third-party loans for which credit union's servicing the geographic region selected in block 510 can likely offer lowest interest rates is determined. In one embodiment, the number of possible lower rate loans in the geographic region is calculated for each of multiple credit tiers of borrowers and/or for each of multiple types of loans. As described with reference to FIG. 3A, for example, the data used to estimate the loan opportunities to a credit union in the region may be received from multiple sources, such as census data, the National Credit Union Administration (NCUA), and credit bureau information, such as statistics regarding self-reported loan information from lenders in the geographic region. In one embodiment, the information used to determine the estimated loan opportunities in the geographic region does not include personal information regarding specific borrowers, but instead comprises aggregate information associated with the group of borrowers in the region. Similarly, in one embodiment the estimated credit union loan rates (such as in column 328 of FIG. 3A) comprise estimated rates for all credit unions in the region, rather than the particular rates for a specific credit union, such as the customer credit union. For example, aggregate data associated with credit unions in multiple regions may be obtained from the NCUA, such as via an Internet download site. Thus, in this embodiment the loan opportunities are estimated, rather than particular to a specific credit union. In other embodiments, however, a customer credit union may provide actual loan rates for use in determination of third-party loan opportunities in the geographic region.

In block 550, the customer is presented with an opportunity summary report indicating at least a quantity of third-party loan opportunities in the selected region. In one embodiment, the third-party loan opportunities comprise estimates of existing third party loans in the geographic region that have an estimated interest rate that is higher than an estimated credit union interest rate in the geographic region. Depending on the embodiment, the opportunity summary report may comprise additional information, such as third-party loan opportunities for each of a plurality of credit tiers, lender types, and/or other segments of a population.

Moving to decision block 560, the requesting customer indicates whether an opportunity detail report is desired. In an embodiment where the customer personally provides data in the loan opportunity interface, the customer may initiate generation of an opportunity detail report. Alternatively, the customer may indicate to a representative of the loan opportunity provider a desire to receive an opportunity detail report. In either case, the method continues to block 570 if the customer desires to receive a opportunity detail report. Depending on the embodiment, the opportunity detail report may be sold to the customer on a per-borrower basis, such that the customer pays a fee that is multiplied by a quantity of borrowers that appear on the opportunity detail report. In other embodiments, the customer pays a flat fee for the opportunity detail report. In other embodiments, other billing methods may be used to initiate sale of a opportunity detail report to the customer prior to providing the detail report to the customer.

In block 570, the customer provides parameters for the opportunity detail report. Depending on the embodiment, the customer may provide parameters for filtering the borrowers included on the detail report based on multiple attributes associated with respective borrowers and their associated credit data, such as outstanding loan data. For example, the customer may indicate that only borrowers in one or more selected credit tiers should be included on the detail report. Similarly, the customer may indicate that only borrowers with current loans from certain types of lenders should be included on the detail report additionally. In one embodiment, the customer may also indicate maximums, minimums, or ranges for one or more of the following attributes that should be included, or excluded, from the detail report: borrower credit score, loan balance, monthly payment, interest rate, loan term, remaining loan term, and/or expected profit on respective loans.

In one embodiment, the customer uses the opportunity summary report in order to determine appropriate parameters for filtering the borrowers to be included on the detail report. For example, if a particular customer has been provided with the opportunity summary report 320A (FIG. 3B), and the customer has a marketing budget to offer refinance opportunities to about 2000 borrowers, the customer may set parameters for the detail report so that only borrowers in the prime credit tier having loans serviced by a finance lender are included in the detail report, which the summary report indicates should result in an estimated 2006 hits. In one embodiment, the parameters for the detail report are provided via the user interface 300, which interfaces with the report module 260 and/or the analysis module 230 to generate the detail report based on the provided customer parameters.

Moving to block 580, the loan opportunity system 150 identifies specific borrowers for which the customer can likely offer lower interest rates. In an advantageous embodiment, contact information for specific borrowers is included in the detail report so that the customer can make firm offers of credit to the borrowers.

In one embodiment, data from the loan data store 120A of a credit bureau, for example, is accessed in order to determine specific loan rates, terms, and other attributes. The data regarding actual loan attributes is then compared to loan rates of the particular credit union, or estimated rates for credit unions in the region, in order to determine specific borrowers for which lower rates are likely available from the customer. The determined borrowers are then filtered according to the customer parameters to include only those borrowers matching the parameters.

In block 590, the customer is presented with an opportunity detail report specifying borrowers for which lower interest rates are likely available from the requesting customer and which satisfy the customer parameters. Because the detail report is based on actual loan data of borrowers, such as self-reported data from lenders, the loan opportunities for a credit tier and/or lender type may vary from the estimated third-party loan opportunities included in a summary report. For example, in the example of FIG. 3B the estimated third-party loan opportunities for a credit union in Wyoming for prime credit borrowers having finance lenders is 2006. However, the opportunity detail report for this same group of borrowers may comprise fewer or additional borrowers, such as 1900, 1950, 2050, 2100, or more borrowers.

Figure 6:
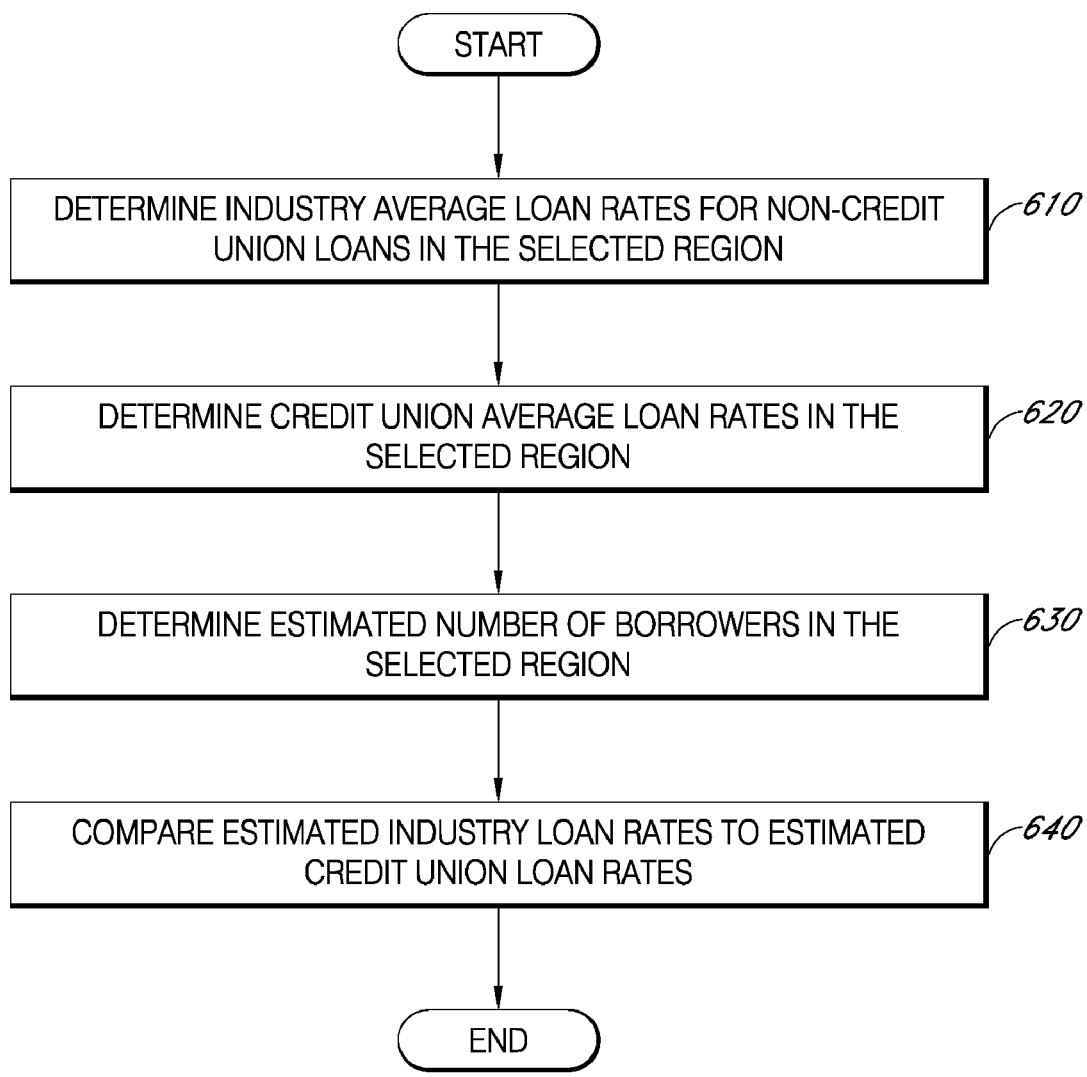
FIG. 6 is a flowchart illustrating one embodiment of a method of comparing interest rates in order to determine loan opportunities in a region, which may be used in a opportunity summary report, for example.

FIG. 6 is a flowchart illustrating one embodiment of a method of comparing interest rates in order to determine loan opportunities in a region, which may be used in an opportunity summary report, for example. Depending on the embodiment, the method of FIG. 6 may comprise fewer or additional blocks and blocks may be performed in a different order than is illustrated.

Beginning in block 610, an industry average loan rate for non-credit union loans in the selected region is determined. As noted above, the industry average loan rates may be accessed from the loan data store 120A (FIG. 1A) and/or credit union data store 170 (FIG. 1B). In one embodiment, loan rates for each of multiple credits tiers, lender types, or other subsets of loan-related groups may be determined.

Next, in block 620, the estimated average credit union loan rates in the selected region is determined. As noted above, in one embodiment the average credit union loan rates in various regions is provided in aggregate data from the NCUA. In other embodiments, the average credit union loan rates are received from other sources. Depending on the embodiment, average loan rates for each of multiple credits tiers, lender types, or other subsets of loan-related groups may also be determined.

Continuing to block 630, the estimated number of borrowers in the selected region is determined. As noted above, in one embodiment the estimated number of borrowers is calculated as the product of the regional population multiplied by the estimated percentage of adults in the region, the product being multiplied by the estimated percentage of adults in the region with auto loans. For example, in the embodiment of FIG. 3A, the estimated number of borrowers in the selected region is calculated as the product of the numerical figures in fields 304, 306, and 312 (e.g., 500,000×74.3%×27.6%=102,572).

Moving to block 640, the determined industry average loan rates are compared to the estimated credit union loan rates in order to determine which subsets of loans, if any, are associated with estimated credit union loan rates that are lower than the corresponding estimated third-party loan rates. For example, the estimated industry average loan rates for borrowers having prime credit may be compared to the estimated credit union loan rates for borrowers having prime credit in order to determine if there are credit union loan opportunities in the prime credit group of borrowers. Similarly, loan rates associated with borrowers having loans from a lender type subset may be compared in order to determine if loans serviced by the lender type comprise loan opportunities to credit unions in the selected region. Depending on the embodiment, the subsets of loans may be further divided according to other attributes associated with the loans.

Figure 7:
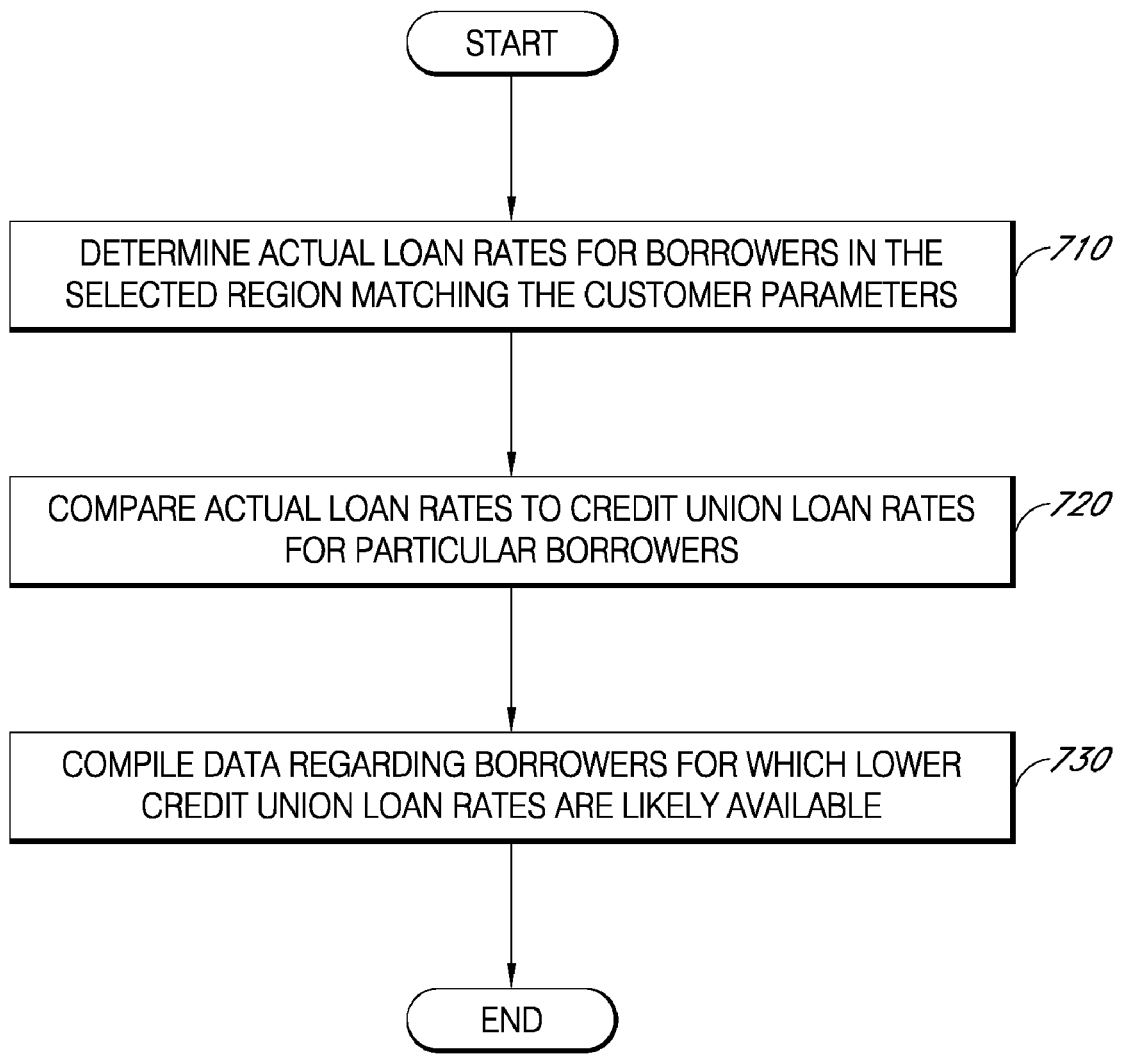
FIG. 7 is a flowchart illustrating one embodiment of a method of identifying borrowers to include in an opportunity detail report.

FIG. 7 is a flowchart illustrating one embodiment of a method of identifying borrowers to include in a opportunity detail report. In one embodiment, the method of FIG. 7 is performed in block 580 of FIG. 5. Depending on the embodiment, the method of FIG. 7 may comprise fewer or additional blocks and blocks may be performed in a different order than is illustrated.

Beginning in block 710, the actual loan rates for borrowers matching the customer parameters are determined. As noted above, the actual loan rates may be received from any suitable data source, such as the loan data store 120A (FIG. 1A) or the credit bureau 180 (FIG. 1B).

In block 720, the actual loan rates determined in block 710 are compared to the actual loan rates for the requesting credit union. In one embodiment, the requesting credit union provides the loan opportunity system 150 with loan rates for each of multiple credits tiers. In this embodiment, the credit tier of specific borrowers is also determined such that the credit union loan rate for the same credit tier may be compared to the actual loan rate for borrowers in that credit tier.

Next, in block 730, data regarding borrowers for which lower credit union loan rates are likely available are compiled for use in a opportunity detail report. Depending on the embodiment, the data comprises various information regarding the borrower, as well as the loan. For example, the data may comprise contact information for the matching borrowers, credit score information regarding the borrowers, and attributes of the open loans of the borrowers.

As discussed above, the systems and methods described herein may be implemented with respect to other lines of credit, such as recreational vehicle loans (e.g., boats, motorcycles, jet skis, etc.), mortgages, home equity loans, credit cards, or other types of credit. In those embodiments where the loan opportunity system provides loan summary and/or detail information regarding other types of credit, the data sources accessed by the system may vary. Additionally, the information requested from a lender, and/or representative of the lender, and provided in the loan and/or detail reports may include different information than in the exemplary user interfaces described and illustrated herein.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof. All of the methods and processes described above may be embodied in, and fully automated via, software code modules executed by one or more general purpose computers. The code modules may be stored in any type of computer-readable medium or other computer storage device. Some or all of the methods may alternatively be embodied in specialized computer hardware.

What is claimed is:

1. A method of determining automobile loan opportunities for a credit union, the method comprising:
    determining a geographic region serviced by the credit union;
    accessing population data estimating a number of adult individuals in the geographic region;
    accessing data estimating a percentage of adults in the geographic region that are currently making payments on at least one automobile loan;
    determining, using a computer processor, an estimated number of individuals with outstanding automobile loans in the geographic region based on the number of adult individuals in the geographic region and the estimated percentage;
    retrieving an estimated number of actual credit union customers, wherein the estimated number of actual credit union customers is an approximate number of individuals who have outstanding automobile loans serviced by the credit union;
    determining, using the computer processor, an estimated number of potential credit union customers, based on a difference between the number of individuals with outstanding automobile loans and the number of actual credit union customers;
    apportioning, using the computer processor, the number of potential credit union customers by a plurality of credit tiers, the apportioning being determined based on population-based percentage information relating to the plurality of credit tiers; and
    displaying a graphical indication of one or more opportunity credit tiers of the plurality of credit tiers, based on a determination, by the computer processor for each tier of the opportunity credit tiers, that an average automobile loan interest rate offered by the credit union for the tier is less than an average automobile loan interest rate for the same tier, wherein the average automobile loan interest rate is retrieved from an external data source.

2. The method of claim 1, further comprising:
    receiving one or more parameters indicating characteristics of borrowers;
    accessing credit data comprising loan information regarding specific borrowers in the geographic region;
    comparing the parameters to the credit data; and
    generating a data structure comprising information regarding borrowers having loan information matching the parameters.

3. The method of claim 2, further comprising entering an agreement for payment from a recipient of the data structure to an entity that performs the generating of the data structure.

4. The method of claim 3, wherein the payment comprises a payment amount for each of the borrowers having loan information matching the parameters.

5. The method of claim 2, wherein the loan information comprises data indicating one or more of a rounded loan balance, a rounded monthly payment amount, an estimated interest rate, a loan term, and/or a loan term remaining.

6. The method of claim 1, wherein the geographic region comprises one or more ZIP code regions, MSA regions, municipalities, cities, counties, states, and countries.

7. The method of claim 1, further comprising generating a user interface depicting at least the estimated number of loan opportunities in the geographic region.

8. The method of claim 1, wherein the estimated number of adult individuals in the geographic region is obtained from government census data.

9. The method of claim 1, wherein the estimated percentage of adults in the geographic region is obtained from government census data.

10. The method of claim 1, wherein the approximate number of individuals who have outstanding automobile loans serviced by the credit union is obtained from the National Credit Union Administration.

11. A computer readable storage medium storing software code configured for execution on a computer system, the software code being configured to perform a method comprising:
    generating a user interface for receiving an indication of a geographic region from a user of the computer system;
    accessing population data estimating a number of adult individuals in the geographic region;
    accessing data estimating a percentage of adults in the geographic region having existing automobile loans;
    determining, using a computer processor, an estimated number of individuals with automobile loans in the geographic region based on the number of adult individuals in the geographic region and the estimated percentage;
    retrieving, from an external data source, an approximate number of automobile loans serviced by one or more credit unions; and
    determining, using the processor, an estimated number of loan opportunities in the geographic region based on a difference between the approximate number of automobile loans serviced by the credit union and the estimated number of individuals with automobile loans;
    apportioning, using the computer processor, the estimated number of loan opportunities into a plurality of credit tiers based upon aggregate population credit data; and
    graphically highlighting a portion of the credit tiers, based on a comparison, by the computer processor, between average interest rates associated with the credit tiers and interest rates offered by the credit unions.

12. The computer readable storage medium of claim 11, wherein at least a portion of the user interface is displayed to the user via a spreadsheet software application executing on the computer system.

13. The computer readable storage medium of claim 11, wherein the method further comprises:
- receiving one or more parameters indicating characteristics of borrowers;
- accessing credit data comprising loan information regarding specific borrowers in the geographic region;
- comparing the parameters to the credit data; and
- generating a data structure comprising information regarding borrowers having loan information matching the parameters.

14. The computer readable storage medium of claim 13, wherein the method further comprises entering an agreement for payment from a recipient of the data structure to an entity that performs the generating of the data structure.

15. The computer readable storage medium of claim 14, wherein the payment comprises a payment amount for each of the borrowers having loan information matching the parameters.

16. The computer readable storage medium of claim 13, wherein the loan information comprises data indicating one or more of a rounded loan balance, a rounded monthly payment amount, an estimated interest rate, a loan term, and/or a loan term remaining.

17. The computer readable storage medium of claim 11, in combination with a computer processor configured to execute the software code stored in the computer readable storage medium.

* * * * *